G. W. ALLEN.
CLING KNIFE.
APPLICATION FILED JAN. 2, 1912.
1,028,175.
Patented June 4, 1912.
2 SHEETS—SHEET 1.
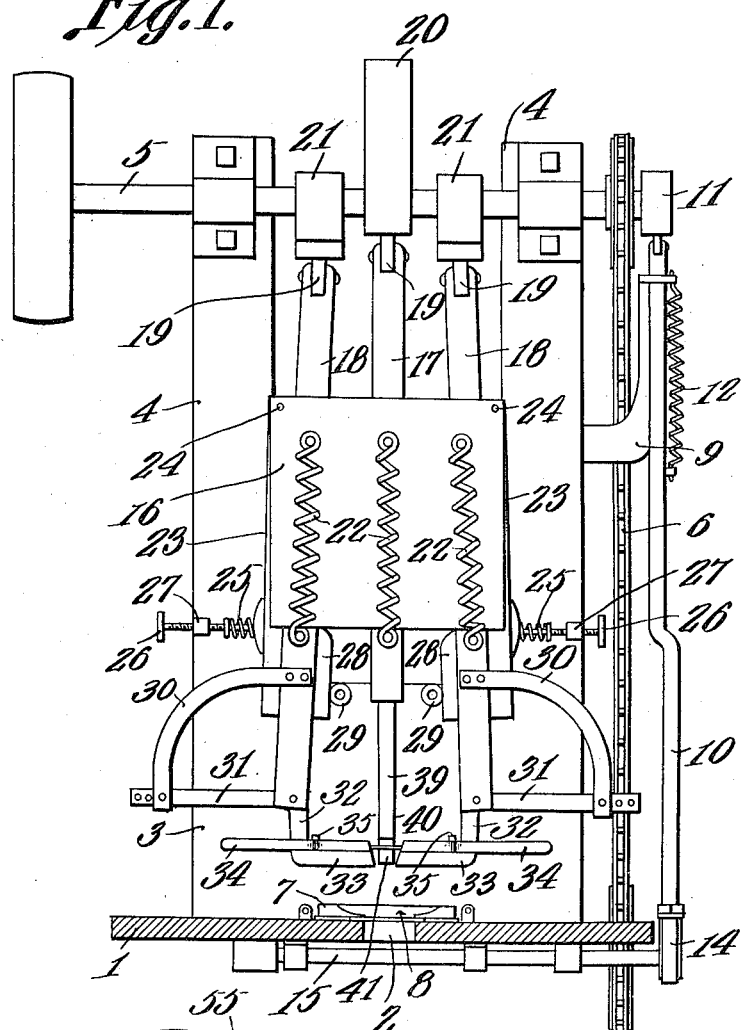
George W. Allen,
Inventor
by C. A. Snow & Co.
Attorneys
Witnesses G. W. ALLEN.
CLING KNIFE.
APPLICATION FILED JAN. 2, 1912.
1,028,175.
Patented June 4, 1912.
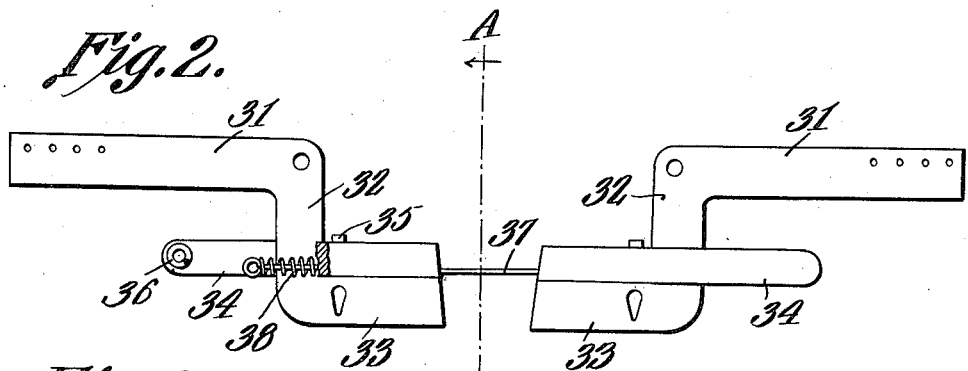
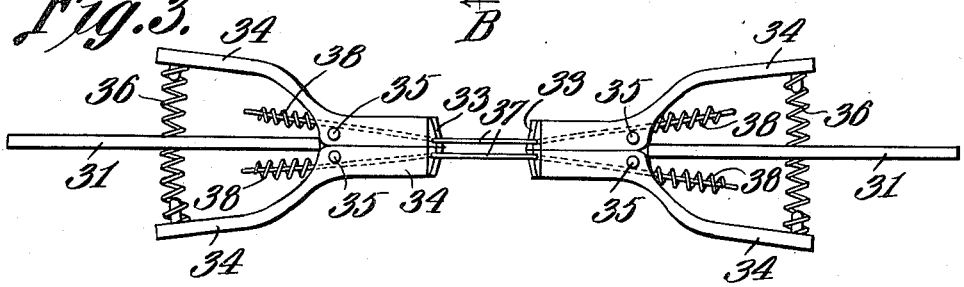
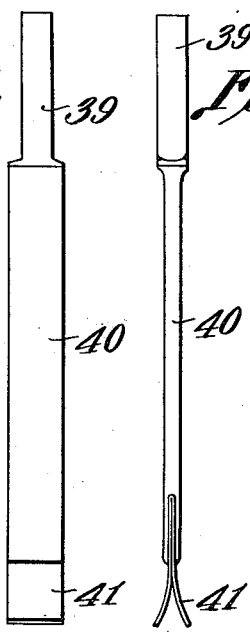
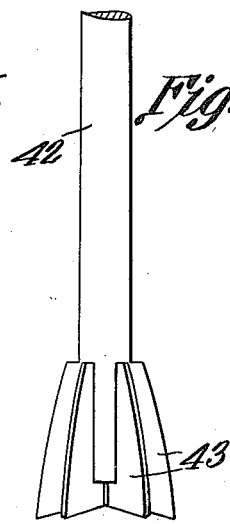
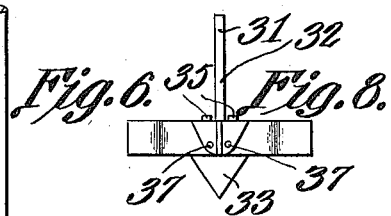
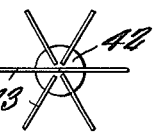
George W. Allen,
Inventor

UNITED STATES PATENT OFFICE.

GEORGE WILLIAM ALLEN, OF SELMA, CALIFORNIA.

CLING-KNIFE.

1,028,175.  Specification of Letters Patent.  Patented June 4, 1912.

Application filed January 2, 1912. Serial No. 668,926.

*To all whom it may concern:*

Be it known that I, GEORGE W. ALLEN, a citizen of the United States, residing at Selma, in the county of Fresno and State of California, have invented a new and useful Cling-Knife, of which the following is a specification.

The device forming the subject-matter of this application is a knife mechanism adapted to bisect a cling-stone peach or like fruit, so that the pit of the peach may be thrust out of the peach without unduly mutilating the fruit.

The invention aims to provide a pair of bisecting knives carrying flexible severing members which, after the knives have bisected the peach, sweep downwardly around both sides of the pit, thereby separating the pit from the body of the peach, so that a pit-engaging thrust member may remove the pit.

A further object of the invention is so to construct this thrust member that it will act as a guide for the severing members, to separate the same, so that they may pass downwardly about the pit of the peach, to separate the pit from the body of the peach.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows in elevation, a portion of a fruit cutter and pitter, to which the device constituting the subject-matter of the present invention has been applied; Fig. 2 is a side elevation of the cutting and pitting mechanism; Fig. 3 is a top plan of the structure shown in Fig. 2; Fig. 4 is a side elevation of the thrust member; Fig. 5 is a side elevation of the thrust member, the view point in Fig. 5 being ninety degrees remote from the view point in Fig. 4; Fig. 6 is an elevation of a thrust member which may be employed for the purpose of extracting split or broken pits from either cling-stone or free-stone fruit; Fig. 7 is a bottom plan of the structure shown in Fig. 6; Fig. 8 is a section upon the line A—B of Fig. 2; and Fig. 9 is a diagrammatic plan of the cams.

The device constituting the subject-matter of the present invention, may be applied to fruit-cutters and pitters of a wide variety of forms. In order to show the structure in operative relation to suitable actuating mechanism, there is depicted a portion of a fruit-cutter and pitter of that general type which appears in Patent #1,006,491, granted upon the 24th day of October 1911, to Jacob P. Marsch. Those portions of the structure shown in the drawings which are peculiar to the patented device above referred to, will be described briefly, the patent in question giving a sufficient disclosure as to details.

In the drawings, there is shown a supporting structure embodying a table 1, provided with an opening 2. Fixed to and rising from the table 1 is a frame 3, including spaced standards 4. Upon the upper ends of the standards 4 a transverse drive shaft 5 is journaled for rotation. The drive shaft 5 is operatively connected by means of a belt 6 with suitable mechanism for operating a conveyer belt 7 which passes across the upper face of the table 1, the conveyer 7 having a series of pockets 8 therein, opening through the belt, and adapted to be alined successively with the opening 2 in the table 1. An arm 9 is secured to one of the standards 4, and in this arm is mounted for vertical reciprocation, a plunger 10, operated by a cam 11 which is secured to one end of the drive shaft 5. The plunger 10 is drawn upwardly by a rectractile spring 12, secured to the plunger and to the arm 9. The plunger 10 is operatively connected as shown at 14, with a transverse shaft 15, journaled for rotation upon the lower face of the table 1. The shaft 15 operates interrupting mechanism, adapted to engage the conveyer belt 7, the construction being such that the interrupting mechanism will, at intervals, engage the belt 7, to hold the belt 7 at rest, thereby to aline the pocket 8 for a brief interval, with the opening 2 in the table 1, so that the pit of the peach which is mounted upon the pocket 8, may be thrust downwardly through the opening 2. The belt conveyer 7 is frictionally connected with the belt 6, so that, although the belt 6 moves continuously, the conveyer belt 7 will be advanced, only when the interrupting mechanism which is carried by the shaft 15, is out of engagement with the conveyer belt, the interrupting mechanism being operated by the co-action between the cam 11 and the upper end of the plunger 10.

The foregoing constitutes no part of the present invention, but is alluded to, generally, in order that the utility of the structure hereinafter described, may more clearly appear.

In carrying out the present invention, a guide 16 is secured to and supported by the standards 4. In this guide is mounted for vertical sliding movement, a primary plunger 17. Secondary plungers 18, located upon both sides of the plunger 17, are mounted for sliding movement in the guide 16. The plungers 17 and 18 are provided at their upper ends with anti-friction elements 19. The primary plunger 17 is actuated by a primary cam 20, secured to the drive shaft 5, and the secondary plungers 18 are actuated by secondary cams 21, secured to the drive shaft 5, upon both sides of the primary cam 20, the several cams serving to depress their individual plungers. The plungers are lifted by means of retractile springs 22 secured to the guide 16 and to the plungers.

Pressure bars 23 are pivoted adjacent their upper ends to the guide 16, as shown at 24. The pressure bars, adjacent their lower, free ends, are thrust inwardly by means of springs 25, the tension of which is adjusted by means of set screws 26, threaded into lugs 27 carried by the arms 4. Secured to the inner faces of the secondary plungers 18 adjacent their lower ends, are cams 28, adapted to ride over rollers 29, journaled upon the frame 3, upon both sides of the primary plunger 17. The springs 25 serve to maintain the cams 28 in engagement with the rollers 29.

The invention further includes a pair of arched, depending supports 30, secured at their upper ends to the secondary plungers 18. Arms 31 are secured at their outer ends to the outer, lower ends of the supports 30, the arms 31 extending inwardly, into connection with the lower ends of the secondary plungers 18. The arms 31 include depending portions 32, carrying at their lower extremities, inwardly projecting cling knives 33, disposed substantially at right angles to the depending portions 32 of the arms 31.

Levers 34 are pivoted as shown at 35, intermediate their ends, to the upper faces of the cling knives 33, for movement in a plane substantially at right angles to the direction of reciprocation of the plungers 18. The outer ends of the levers 34 are thrust apart, and the inner ends of the levers are thrust together, by means of compression springs 36, interposed between the outer ends of the levers 34. Each pair of knives 33, alined transversely of the machine, supports slidably, a severing member. The severing members preferably take the form of flexible wires 37, mounted to slide longitudinally in the oppositely disposed knives 33, compression springs 38 being interposed between the outer ends of the wires 37 and the outer ends of the knives 33.

The invention further includes a thrust member 39 which is carried by the primary plunger 17, the thrust member including a flattened shank 40, and diverging blades 41. It is between the severing members 37 that the thrust member 39 reciprocates vertically.

In practical operation, a peach is carried beneath the thrust member 39, by the conveyer belt 7, the conveyer belt coming to rest, through the action of the interrupting mechanism carried by the shaft 15, when the peach is positioned directly beneath the thrust member 39. When the drive shaft 5 is rotated, the cam 20 will depress the primary plunger 17, and correspondingly depress the thrust member 39, the blades 41 of the thrust member entering the top of the peach and resting upon the top of the pit of the peach. The cam 20 is so constructed that the thrust member 39 will come to rest, so soon as the blades 41 are in contact with, or closely adjacent, the pit of the peach.

When the drive shaft 5 is rotated, the secondary cams 21 will depress the secondary plungers 18. When the plungers 18 are depressed, the lower ends of the plungers will, first, be separated, as the inner faces of the cams 28 ride along the rollers 29. By this operation, the cling knives 33 will engage the top of the peach and move longitudinally to cut down thereinto, with a draw cut, the knives moving outwardly, around the ends of the pit. When the lower ends of the plungers 18 are separated, in the manner hereinbefore described, resulting in a separation of the cling knives 33, upon both sides of the line A—B in Fig. 2, the severing members 37 will slide longitudinally in the knives 33, the springs 38 permitting such movement. The severing members 37 will enter the cut previously made by the cling knives 33, the severing members sliding around the pit, and freeing the pit from the meat of the peach, the severing members 37 conforming closely to the contour of the pit, by reason of the fact that the severing members are flexible, and spring-supported at 38, and by reason of the fact that the knives 33 are pivoted as shown at 35. When the plungers 18 have been depressed sufficiently so that the upper ends of the cams 28 ride off the rollers 29, the levers 34, and consequently the severing members 37, will come together, beneath the pit of the peach.

Recalling that the thrust member 39 is located between the severing members 37, and noting that the blades 41 of the thrust member diverge, it will be seen that the blades 41 constitute guides, adapted to separate the severing members 37, so that the same will be spaced, to travel downwardly around the pit of the peach. When the secondary plungers 18 are elevated, due to the action of the corresponding springs 22, the severing members 37 will ride upwardly, around the periphery of the pit of the peach, and travel upwardly along the diverging blades 41, whereupon the operation hereinbefore described, may be repeated.

Referring to Fig. 9, it is to be noted that while the end of the primary plunger 17 is traversing the edge 50 of the primary cam 20, the end of the secondary plunger 18 will traverse the edge 51 of the cam 21. Owing to the shapes of the edges 50 and 51, the primary plunger 17 will be depressed more rapidly than the secondary plunger 18, so that the blades 41 of the plunger-carried element 40 will come down upon top of the pit, before the wires 37 engage the pit. While the end of the primary plunger 17 is traversing the edge 52 of the primary cam 20, the plunger 17 will remain substantially at rest, so far as vertical movement is concerned, and at the same time, the secondary plunger 18 will be depressed, by reason of the fact that its upper end will be traversing the edge 53 of the cam 21. While the upper end of the primary plunger 17 is traversing the edge 54 of the cam 20, the plunger 17 will be thrust downwardly, expelling the pit of the fruit. Obviously, while the plunger 17 traverses the edge 56 of the cam 20, and while the plunger 18 traverses the edge 55 of the cam 21, the plungers 17 and 18 will be elevated by the action of the springs 22.

In Fig. 6 there is shown a member adapted to be employed for extracting split or broken pits from either cling-stone or free-stone fruit. This element comprises a shank 42, equipped at its lower end with fixed radiating blades 43. The device shown in Fig. 6 is adapted to be employed in the place of the thrust member 39. When the structure shown in Fig. 6 is employed, the mechanism shown in Figs. 2 and 3 is detached from the machine, the mechanism shown in Figs. 4 and 3 being adapted for use in connection with the thrust member 39, alone.

Having thus described the invention, what is claimed is:—

1. In a fruit pitting machine, severing mechanism including a pair of transversely flexible members adapted to sweep the periphery of the pit of the fruit and to conform to the shape of the pit of the fruit solely by their flexibility; and means for producing relative movement between the severing mechanism and the fruit.

2. In a fruit pitting machine, severing mechanism including resilient parallel wires adapted to sweep the periphery of the pit of the fruit; and a device for producing relative movement between the fruit and the wires.

3. In a fruit pitting machine, severing mechanism including yieldably supported members adapted to flex transversely and to sweep the periphery of the pit of the fruit, and means for securing each of the yieldably supported members at both of its ends; and a device for producing relative movement between the fruit and the severing mechanism.

4. In a fruit pitting machine, severing mechanism including a pair of straight, transversely flexible members adapted to sweep the periphery of the fruit and to conform to the shape of the pit solely by their flexibility; and means for producing relative movement between the severing mechanism and the fruit.

5. In a fruit pitting machine, severing mechanism including a pair of transversely flexible members adapted to sweep the periphery of the pit of the fruit and to conform to the shape of the pit solely by their flexibility, and means for holding each of the flexible members at both ends; and means for producing relative movement between the severing mechanism and the fruit.

6. In a fruit pitting machine, severing mechanism including knives adapted to form an initial cut in the fruit and transversely flexible members carried by the knives and adapted to enter the cut and to sweep the periphery of the pit of the fruit; and a device for moving the severing mechanism toward and away from the fruit, and for separating the knives to cause the same to clear the ends of the pit of the fruit, the knives when separated, constituting means for tightening the flexible members about the pit.

7. In a fruit pitting machine, severing mechanism including knives adapted to form an initial cut in the fruit, transversely flexible members slidably supported by the knives and adapted to enter the cut and to sweep the periphery of the pit of the fruit; and springs connected with the flexible members to resist the sliding movement thereof; and a device for moving the severing mechanism toward and away from the fruit, and for separating the knives to cause the same to clear the ends of the pit of the fruit, the knives, when separated, constituting means for tensioning the springs.

8. In a fruit pitting machine, severing mechanism including knives adapted to form an initial cut in the fruit, levers pivoted upon the knives, and yieldable members slidable in the levers, and adapted to enter the cut and to sweep the periphery of the pit of the fruit; and a device for moving the severing mechanism toward and away from the fruit.

9. In a fruit pitting machine, severing mechanism including knives adapted to form an initial cut in the fruit, levers pivoted upon the knives, and yieldable members slidable in the levers and adapted to enter the cut and to sweep the periphery of the pit of the fruit; and a device for moving the severing mechanism toward and away from the fruit, and for separating the knives to cause the same to clear the ends of the pit of the fruit.

10. In a fruit pitting machine, severing mechanism including knives adapted to form an initial cut in the fruit, levers pivoted upon the knives, and resilient members connecting the levers and adapted to enter the cut and to sweep the periphery of the pit of the fruit; and a device for moving the severing mechanism toward and away from the fruit.

11. In a fruit pitting machine, severing mechanism including knives adapted to form an initial cut in the fruit, levers pivoted upon the knives, and resilient members connecting the levers and adapted to enter the cut and to sweep the periphery of the pit of the fruit; and a device for moving the severing mechanism toward and away from the fruit, and for separating the knives, to cause the same to clear the ends of the pit of the fruit.

12. In a fruit pitting machine, severing mechanism including knives adapted to form an initial cut in the fruit, levers pivoted upon the knives, yieldable members slidable in the levers and adapted to enter the cut and to sweep the periphery of the pit of the fruit, and springs connecting the yieldable members with the levers; and a device for moving the severing mechanism toward and away from the fruit.

13. In a fruit pitting machine, severing mechanism including knives adapted to form an initial cut in the fruit, levers pivoted upon the knives, yieldable members slidable in the levers, springs connecting the yieldable members with the levers; and a device for moving the severing mechanism toward and away from the fruit, and for separating the knives, to cause the same to clear the ends of the pit of the fruit.

14. In a fruit pitting machine, severing mechanism including knives adapted to form an initial cut in the fruit, levers pivoted upon the knives, resilient members connected with the levers, and adapted to enter the cut and to sweep the periphery of the pit of the fruit, and spring means engaging the levers, to cause the yieldable members to engage the periphery of the fruit; and a device for moving the severing mechanism toward and away from the fruit.

15. In a fruit pitting machine, severing mechanism including knives adapted to form an initial cut in the fruit, levers pivoted upon the knives, yieldable members slidable in the knives, and adapted to enter the cut and to sweep the periphery of the pit of the fruit, and springs engaging the levers, to cause the yieldable members to engage the periphery of the pit of the fruit; and a device for moving the severing mechanism toward and away from the fruit, and for separating the knives, to cause the same to clear the ends of the pit of the fruit.

16. In a fruit pitting machine, severing mechanism including transversely flexible members adapted to sweep the periphery of the pit of the fruit; a pit-expelling plunger operating between the transversely flexible members; and a device for flexing said members intermediate their ends to permit the passage of the plunger between said members.

17. In a fruit pitting machine, severing mechanism including yieldably supported members adapted to sweep the periphery of the pit of the fruit and to pass between the pit and the meat; a pit-expelling plunger operating between the yieldably supported members, and comprising pit-engaging parts having diverging outer faces constituting means for separating the yieldably supported members and for guiding them about the periphery of the pit of the fruit; and a device for producing relative movement between the severing mechanism and the pit-expelling plunger upon the one hand and the fruit upon the other hand.

18. In a fruit pitting machine, severing mechanism including knives adapted to form an initial cut in the fruit, transversely flexible members adapted to enter the cut and to pass between the meat and the pit, and means for securing each of the flexible members slidably at both of its ends; a pit-expelling plunger operating between the flexible members; and a device for producing relative movement between the fruit upon the one hand, and the pit-expelling plunger and the severing mechanism upon the other hand.

19. In a fruit pitting machine, severing mechanism including knives adapted to form an initial cut in the fruit, and transversely flexible members adapted to enter the cut and to sweep the periphery of the fruit; a pit-expelling plunger operating between the flexible members and including parts having diverging outer faces adapted to flex the said members transversely and to constitute guides to direct the flexible members about the pit; and means for producing relative movement between the fruit upon the one hand, and the severing mechanism and the plunger upon the other hand.

20. In a fruit pitting machine, severing mechanism including knives adapted to form an initial cut in the fruit and yieldable members supported by the knives and adapted to enter the cut and to sweep the periphery of the pit of the fruit, a pit-expelling plunger operating between the yieldable members; and a device for moving the severing mechanism and the pit-expelling plunger toward and away from the fruit.

21. In a fruit pitting machine, severing mechanism including knives adapted to form an initial cut in the fruit and yieldable members supported by the knives and adapted to enter the cut and to sweep the periphery of the pit of the fruit; a pit-expelling plunger operating between the yieldable members, and comprising diverging parts, adapted to engage the pit, and to constitute means for directing the yieldable members about the periphery of the pit; and a device for moving the severing mechanism and the pit-expelling plunger toward and away from the fruit.

22. In a fruit pitting machine, severing mechanism including knives adapted to form an initial cut in the fruit and transversely flexible members supported by the knives and adapted to enter the cut and to sweep the periphery of the pit of the fruit; springs connected with the ends of the flexible members, means for producing relative movement between the severing mechanism and the fruit; and means for separating the knives, to cause the same to clear the ends of the pit of the fruit, and to tension the springs.

23. In a fruit pitting machine, severing mechanism including knives adapted to form an initial cut in the fruit and flexible members supported by the knives and adapted to enter the cut and to sweep the periphery of the pit of the fruit; a pit-expelling plunger mounted to reciprocate between the yieldable members, and including pit-engaging parts having merging outer faces constituting guides to flex the members and to direct the same about the periphery of the pit of the fruit; and means for separating the knives, to cause the same to clear the ends of the pit of the fruit, and to tighten the flexible members upon the pit.

24. In a fruit pitting machine, severing mechanism including knives adapted to form an initial cut in the fruit, levers pivoted upon the knives, yieldable members carried by the levers and adapted to enter the cut and to sweep the periphery of the fruit; a pit-expelling plunger operating between the yieldable members; and a device for moving the severing mechanism and the pit-engaging plunger toward and away from the fruit.

25. In a fruit pitting machine, severing mechanism including knives adapted to form an initial cut in the fruit, levers pivoted upon the knives, and yieldable members connected with the levers and adapted to enter the cut and to sweep the periphery of the pit of the fruit; a pit-expelling plunger mounted to reciprocate between the yieldable members, and including diverging, pit-engaging parts, constituting guides to direct the yieldable members about the periphery of the pit of the fruit; and a device for moving the pit-engaging plunger and the severing mechanism toward and away from the fruit.

26. In a device of the class described, severing mechanism including knives adapted to form an initial cut in the fruit, levers pivoted upon the knives, yieldable members connecting the levers, and adapted to enter the cut and to sweep the periphery of the pit of the fruit, and spring means engaging the levers, to cause the yieldable members to engage the periphery of the pit of the fruit; a pit-engaging plunger mounted to reciprocate between the yieldable members; and means for moving the pit-engaging plunger and the severing mechanism toward and away from the fruit.

27. In a fruit pitting machine, severing mechanism including knives adapted to form an initial cut in the fruit, levers pivoted upon the knives, yieldable members connected with the levers and adapted to enter the cut, and to sweep the periphery of the pit of the fruit; a pit-engaging plunger mounted for reciprocation between the yieldable members, the plunger including diverging, pit-engaging parts, constituting means for directing the yieldable members about the periphery of the pit of the fruit; and a device for moving the pit-engaging plunger and the severing mechanism toward and away from the fruit.

28. In a fruit pitting machine, severing mechanism including knives adapted to form an initial cut in the fruit, levers pivoted upon the knives, yieldable members connected with the levers and adapted to enter the cut and to sweep the periphery of the pit of the fruit, spring means engaging the levers to cause the yieldable members to engage the periphery of the pit of the fruit, a pit-engaging plunger mounted to reciprocate between the yieldable members, the plunger including diverging, pit-engaging parts, constituting guides for directing the yieldable members about the periphery of the pit of the fruit; a device for moving the pit-engaging plunger and the severing mechanism toward and away from the fruit; and means for effecting a separation of the knives, to cause the same to clear the ends of the pit of the fruit.

29. As an article of manufacture, a severing mechanism for a fruit pitting machine, comprising oppositely disposed knives; levers pivoted upon the knives; and spaced, resilient pit-engaging elements connecting the lever of one knife with the oppositely disposed lever of the other knife.

30. As an article of manufacture, a severing mechanism for a fruit pitting machine, comprising oppositely disposed knives; levers pivoted upon the knives; spaced yieldable pit-engaging elements slidable in the levers and protruding beyond the levers; and springs connecting the protruding ends of the yieldable elements with the levers.

31. As an article of manufacture, severing mechanism for a fruit pitting machine, comprising oppositely disposed knives; levers fulcrumed intermedite their ends upon the knives; resilient pit-engaging members yieldably connected with the levers, adjacent the inner ends of the levers; and spring means interposed between the outer ends of the levers, for forcing the inner ends of the levers together.

In testimony that I claim the foregoing as my own, I have hereto affixed my signature in the presence of two witnesses.

GEORGE WILLIAM ALLEN.

Witnesses:
Roy C. Trober,
N. Lindsay South.